United States Patent Office 2,831,027
Patented Apr. 15, 1958

2,831,027

ISOCAMPHANE COMPOUNDS AND PROCESSES FOR PREPARING THE SAME

Karl Pfister III, Westfield, and Gustav A. Stein, Plainfield, N. J., assignors to Merck & Co., Inc., Rahway, N. J., a corporation of New Jersey No Drawing. Application June 6, 1955
Serial No. 513,584

9 Claims. (Cl. 260—563)

This invention is concerned with novel isocamphane compounds. More particularly, it relates to new N-substituted derivatives of 2-aminoisocamphane and methods of preparing the same.

The novel compounds of the present invention having the structural formula:

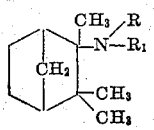

wherein R is lower alkyl group and $R_1$ is hydrogen or a lower alkyl group, are valuable ganglionic blocking agents.

It is an object of the present invention to provide novel N-substituted derivatives of 2-aminoisocamphane. Another object is to provide processes for the preparation of N-alkyl substituted derivatives of 2-aminoisocamphane. Other objects of our invention will be apparent from the detailed description hereinafter provided.

In accordance with one embodiment of the present invention, it is now found that 2-(N-methylamino) isocamphane is obtained by intimately contacting camphene with hydrogen cyanide and an acid to produce 2-(N-formylamino) isocamphane, and reducing this formyl derivative.

The conversion of camphene to the 2-(N-formylamino) isocamphane is conveniently effected by intimately contacting camphene with hydrogen cyanide and sulfuric acid or a sulfonic acid in glacial acetic acid at low temperatures under essentially anhydrous conditions. Although higher temperatures can be employed, we have found that when this reaction is carried out at temperatures below about 20° C. maximum yields of the desired formamido compound are obtained under optimum conditions. Generally we prefer to effect the reaction by mixing the reactants at temperatures between about 0° and 5° C., and then allowing the reaction mixture to warm up to about 20° C. to complete the reaction.

The preparation of the formamido compound can be carried out utilizing hydrocyanic acid or a cyanide salt which will furnish the hydrocyanic acid in situ by reaction with the acid present. The hydrocyanic acid should be present in an amount equivalent to at least one mole per mole of camphene. However, we have found that it is preferable to have the equivalent of at least two moles of hydrocyanic acid present since with such an excess of this reactant maximum yields of the desired product are obtained under optimum conditions.

The sulfuric acid or sulfonic acid employed in the reaction should be essentially anhydrous since it is desirable to carry out the reaction under essentially anhydrous conditions. The acid should be present in an amount equivalent to at least one mole per mole of the camphene reacted. Generally, we prefer to employ an excess of the acid, for example, 2 to 3 moles per mole of camphene since the use of an excess of acid results in the obtainment of maximum yields of the formamido compound.

In addition to sulfuric acid, the sulfonic acids, i. e., acids having a —$HSO_3$ group are suitable in this reaction. Examples of such sulfonic acids that might be mentioned are alkyl sulfonic acids such as methane sulfonic acid, ethane sulfonic acid, and the like; aromatic sulfonic acid such as benzene sulfonic acids, toluene sulfonic acids, naphthalene sulfonic acids, and the like.

Thus, the formamido compound is conveniently prepared by dissolving the camphene in glacial acetic acid, adding liquid hydrogen cyanide thereto, cooling the resulting solution to a temperature of about 0° C., and then adding a mixture of sulfuric acid in acetic acid while maintaining the temperature of the reaction mixture between about 0° and 5° C. The resulting reaction mixture is then allowed to rise to about 20° at which point the reaction is essentially complete.

The desired 2-(N-formylamino) isocamphane is conveniently recovered from the reaction mixture by the addition of cold water and extraction of the formamido compound with a suitable solvent such as chloroform. The product is recovered from the chloroform solution by adding a dilute solution of an aqueous alkali such as sodium bicarbonate to the chloroform extract until the aqueous layer has a pH of about 7 to 8. The chloroform solution is then washed with water to remove the excess alkali and finally dried and evaporated to dryness under diminished pressure. The residue so obtained is dissolved in petroleum ether and then cooled to obtain 2-(formylamino) isocamphane in crystalline form.

Pursuant to a further embodiment of our invention, we have found that 2-(N-formylamino) isocamphane can be reduced to 2-(N-methylamino) isocamphane by reaction with an aluminum hydride. This reaction is conveniently effected in a suitable anhydrous non-reactive solvent such as ethyl ether with an alkali metal hydride such as lithium aluminum hydride or sodium aluminum hydride. In effecting the reaction, the aluminum hydride should be present in an amount equivalent to about 2 moles of hydride per mole of formamido compound. Thus, the reduction is conveniently effected by dissolving lithium aluminum hydride in ethyl ether, adding a solution of 2-(N-formylamino) isocamphane in anhydrous ether thereto, and refluxing the resulting solution for about 4 to 6 hours. At this point the reduction of the formamido compound is substantially complete. The methylamino compound thus produced is recovered by adding water to the reaction mixture, filtering the resulting solution and concentrating the filtrate to a small volume. The desired N-methyl compound is then conveniently recovered in the form of its chloride salt by adding a solution of ether saturated with HCl to the concentrate whereupon the hydrochloride salt of 2-(N-methylamino) isocamphane precipitates in crystalline form and can be recovered and dried.

In accordance with a further embodiment of this invention, we have found that the formamido compound can be converted to 2-aminoisocamphane by action with a base. Thus, when an aqueous methanol solution of the formamido compound and an alkali such as potassium hydroxide or sodium hydroxide is heated under reflux, 2-aminoisocamphane is produced. The product can be recovered from the reaction by evaporating the solvent, removing the 2-aminoisocamphane by steam distillation, extracting the product from the distillate by extraction with a water immiscible solvent for the 2-aminoisocamphane, and evaporating the solvent extract.

Pursuant to a further embodiment of our invention, we have found that the N-methylamino isocamphanes can be prepared by reacting 2-aminoisocamphane with formaldehyde and hydrogen in the presence of a hydrogenation catalyst of the platinum group. Thus, when a mixture of the hydrochloride salt of 2-aminoisocamphane, water, formaldehyde and a small amount of sodium acetate is reacted with hydrogen in the presence of palladium on charcoal and the reaction allowed to continue until the equivalent of about one mole of hydrogen per mole of 2-aminoisocamphane is absorbed, 2-(N-methylamino) isocamphane is produced. When the reaction is continued until about two mole equivalents of hydrogen are absorbed, 2-(N,N-dimethylamino) isocamphane is produced. The N-methyl derivatives so prepared can be readily recovered from the reaction mixture by removing the solvent under diminished pressure. The product so obtained can be further purified by dissolving it in water, adding alkali to the resulting solution to make it alkaline, extracting the alkaline solution with a water-immiscible solvent for the methylated amino isocamphane such as ether, evaporating the solvent solution, and finally distilling the methyl derivative under diminished pressure.

In similar manner other N-lower alkyl derivatives of 2-aminoisocamphane can be prepared. Thus, when acetaldehyde is used in place of formaldehyde in the above-described process the corresponding N-ethylamino and N,N-diethylamino compounds are obtained.

In accordance with a further embodiment of our invention other N-lower alkyl derivatives of 2-aminoisocamphane are produced by reacting 2-aminoisocamphane with a lower aliphatic carboxylic acid acylating agent to obtain the corresponding acylamino isocamphane, and then reducing this acylamino compound to produce the corresponding 2-(N-lower alkyl amino) isocamphane or 2-(N,N-di-lower alkyl amino) isocamphane. For example, 2-(N-ethylamino) isocamphane is produced by reacting 2-aminoisocamphane with about one mole-equivalent of acetyl chloride in the presence of a base to produce 2-(N-acetylamino) isocamphane. The product is then reduced by reaction with an aluminum hydride following the procedures described above for the reduction of the formylamino compound. Alternatively, the monoacetyl derivative is also prepared by reacting the amino camphane with glacial acetic acid or preferably acetic anhydride in the presence of a small amount of sulfuric acid. In accordance with the above-described methods, the N-ethyl, N-propyl, N-butyl, N-hexyl, N-octyl, N-isopropyl, and N-isobutyl derivatives of 2-aminoisocamphane are obtained.

The N-lower alkyl derivatives of 2-aminoisocamphane are converted to 2-(N,N-di-lower alkyl amino) isocamphane by reacting the mono alkyl derivative with a lower aliphatic acid acylating agent to obtain the corresponding acylated derivative, and then reducing this product. Thus, 2-(N,N-diethylamino) isocamphane is produced by reacting 2-(N-ethylamino) isocamphane with acetic anhydride in the presence of a small amount of sulfuric acid to produce the N-acetyl derivative which on treatment with lithium aluminum hydride is reduced to the diethyl derivative. In similar manner, other dialkyl derivatives such as the dipropyl, dibutyl, dihexyl, diisopropyl, and the diisobutyl compounds are obtained. Alternatively, dialkyl derivatives in which the alkyl substituents are different such as the methyl-ethyl, ethyl-hexyl, methyl-isopropyl, and the like are also prepared by this method.

The following examples are given for the purpose of illustration:

EXAMPLE 1

*Preparation of 2-(N-formylamino) isocamphane*

Into a three-necked flask which had been equipped with an agitator, thermometer, dropping funnel and reflux condenser through which water at 5–10° C. was circulated, 31.7 g. of dl-camphene was added and 58 cc. of glacial acetic acid. The mixture was stirred until all the solid had dissolved and then with stirring cooled to 10–12° C. At this point 20 cc. of liquid hydrogen cyanide was added while continuing the stirring. The solution was now cooled to 0° C. A slurry of white crystalline solid separated. With the maintenance of the reaction temperature at 0–2° C. by outside cooling, the addition of a solution of 63.5 cc. of conc. $H_2SO_4$ in 58 cc. of glacial acetic acid was begun. After the addition of about 1–2 cc. of the sulfuric acid solution, the reaction became very fluid and most of the solid dissolved. The acid was added over a period of two hours, during which time the reaction took on a yellowish color. After all the acid was added the yellow-orange reaction mixture was stirred for an additional hour at 0–2° C. The cooling bath was removed and the reaction temperature was allowed to rise to 22° C. in 2 hours. The viscous reaction mixture was put under vacuum (25–35 mm.) for 15–30 minutes with stirring in order to remove most of the excess of hydrogen cyanide.

After most of the cyanide had been removed, the reaction was quenched by the slow addition of 500 cc. of cold water. The temperature of the reaction was maintained at 18–20° C. by external cooling. The resulting milky solution was extracted with 2×100 cc. of chloroform and 1×50 cc. of the same solvent. Care must be exercised at this point for the aqueous as well as the organic extracts contain hydrogen cyanide. The chloroform layer was washed with 2×100 cc. of water and then brought to a pH of 7–8 with a 10% solution of sodium bicarbonate, and finally washed with 150 cc. portions of water until the aqueous layer was free of cyanide.

After the final water wash, the chloroform layer was dried over 20 gm. of anhydrous sodium sulfate, filtered and concentrated on the steam bath in a vacuum of 25–35 mm. to dryness. When practically no more chloroform distilled, the yellow viscous residue was flushed with 100 cc. of n-heptane (Skellysolve C) at 25–35 mm. at 100° C. in order to remove the remaining chloroform. The residue was dissolved in 140 cc. n-heptane at 100° C. After all the residue had gone into solution, it was cooled slowly with agitation in order to allow slow crystallization. After 5 hours the temperature had fallen to 20–25° C. and a copious white precipitate had settled. The mixture was cooled with stirring to 5° C. for 8–10 hours, filtered and washed with cold n-heptane (3×10 cc.) and finally with 3×15 cc. of petroleum ether. The dl-2-(N-formylamino) isocamphane so obtained melted at 160–163° C.

EXAMPLE 2

*Preparation of 2-(N-formylamino) isocamphane*

Into a 5-liter three necked round bottom flask equipped with stirrer, dropping funnel and thermometer, was added 325 ml. of glacial acetic acid. Then, portionwise, a total of 133 g. of sodium cyanide (granular, 2.6 mole) was added with stirring while holding the temperature at 15° C. To the thick white slurry was added dropwise a previously prepared cold mixture of 325 ml. glacial acetic acid and 360 ml. conc. sulfuric acid. After addition of a few ml. at 15° C., the thick slurry thins slowly and the remainder of the sulfuric-glacial acetic acid mixture was added at 0–2° C. A total of about 2 hours was required for the addition. After addition, stirring was continued for 15 minutes. Then dropwise, over an hour, a solution of 178 g. (1.3 mole) of dl-camphene in 50 ml. of glacial acetic acid was added while keeping the temperature at about 0° C. (±3°).

Stirring was continued for two hours at 0° C. during which time a slight pinkish-yellow color developed in the reaction mixture. The cooling bath was removed and the temperature allowed to rise to 15–20° C. in about 2–3 hours. The ice bath was then replaced and while holding the temperature at about 20° C., the mixture was gradually diluted with 3 liters of water while stirring vigorously. After an hour or two of good agitation at room temperature, the oily product was extracted with 2×500 ml. and 1×200 ml. of chloroform and the combined extracts washed with 2×500 ml. of water. The chloroform extract was then rendered neutral by stirring with 500 ml. water and gradually adding solid sodium bicarbonate to the mixture until the aqueous phase had a pH of about 7; required, approximately 88 g. of $NaHCO_3$. After separation the chloroform layer was washed with 2×500 ml. water, dried over calcium chloride, and after filtration the solvent was removed in vacuo on the steam bath. A solid somewhat sticky residue of 231.2 g. was obtained. After removal of last traces of chloroform by repeated swishing with petroleum ether, the cake was finally refluxed with about 500 ml. petroleum ether (B. 30–60° C.) until a thick crystalline slurry was obtained. After refrigeration for a day, the white crystalline mass was filtered by suction, washed with petroleum ether (2×125 ml.), then n-heptane (2×125 ml.) and again with petroleum ether (2×125 ml.). After air drying at room temperature to constant weight, 180.6 g. of the dl-2-(N-formylamino) isocamphene melting at 160–165° C. was obtained.

The combined petroleum ether and n-heptane washes were concentrated under diminished pressure and the residual oil dissolved in a minimum amount of hot petroleum ether (about 75 ml.). The resulting solution was placed in the refrigerator for two days. The precipitated dl-2-(N-formylamino) isocamphane was then recovered by filtration and washed with petroleum ether and n-heptane as described above. Obtained 12.6 g. of product having a melting point of 158–164° C.

The dl-2-(N-formylamino) isocamphane (193 g.) was dissolved in 1.9 liter n-heptane by heating on steam bath. After clarifying the solution by filtration, the clear filtrate was allowed to stand at room temperature until crystallization was complete. The crystalline product is filtered by suction, washed with a little cold n-heptane and air dried. The dl-2-(N-formylamino) isocamphane melted at 169–174° C.

EXAMPLE 3

Preparation of 2-(N-methylamino) isocamphane

To 4.23 liters of anhydrous ether in a 12-liter three-necked flask fitted with a stirrer, reflux condenser and dropping funnel was quickly added 78 g. (2.05 mole) of lithium aluminum hydride. The mixture was gently refluxed with stirring until all hydride had dissolved which required several hours.

A solution of 168 g. (0.92 mole) of dl-2-(N-formylamino) isocamphane, prepared as described in Example 2, in 1.81 liters of anhydrous ether was then added during a period of about one hour with stirring. After addition, the mixture was refluxed for about 6 hours after which it was cooled slightly and 347 ml. of water added with stirring, hydrogen gas being evolved during the addition. Stirring was continued until the precipitate has changed to a powder, which was filtered by suction and washed with ether (a total of about 2 liters). The combined filtrate and washes were concentrated to 1.6 liters and the concentrate containing the dl-2-(N-methylamino) isocamphane washed once with about 350 cc. water, and then dried over anhydrous sodium sulfate. The dried ether concentrate was then cooled in an ice bath and with stirring a cold saturated ethereal-hydrogen chloride solution was added slowly until acid to Congo red; required about 440 ml. anhydrous ether saturated (at 0° C.) with HCl gas. After precipitation was complete, the white crystalline dl-2-(N-methylamino) isocamphane hydrochloride was filtered, and washed with anhydrous ether (about 1 liter) until the washes were neutral.

The dl-2-(N-methylamino) isocamphane hydrochloride was air dried at room temperature. Obtained, 156.5 g. of product melting with decomposition at 249° C.

The dl-2-(N-methylamino) isocamphane hydrochloride (156.5 g.) was dissolved in 1.5 liters of boiling isopropanol and then allowed to crystallize at room temperature for about 2 days. After filtration, the product was washed with a little cold isopropanol (2×70 ml.) and air dried at room temperature. Obtained, 104 g. of product melting with decomposition at 249° C.

EXAMPLE 4

Preparation of 2-aminoisocamphane dl-2-(N-formylamino) isocamphane (21.75 g.) was dissolved in a mixture containing 70 g. sodium hydroxide, 70 cc. water and 210 cc. methanol, and the resulting solution refluxed for about 16 hours. After removal of the bulk of methanol (in vacuo at about 50°), the alkaline liquor is steam stripped until no more oil is collected. The distillate is saturated with sodium chloride and the amine extracted with ether. After drying ($Na_2SO_4$) and removal of the ether, the oily residue crystallizes to obtain the dl-2-aminoisocamphane as a waxy solid melting at 172–174° C. with softening at 171° C.

After subliming the product under diminished pressure the dl-2-aminoisocamphane melted at 173–175° C.

The amine is slightly soluble in water; the pH of the solution is about 10.5. For further identification it was converted to the hydrochloride which is obtained in quantitative yield and in a crystalline form by neutralizing the base with HCl and concentrating the solution.

*Analysis.*—Calcd. for $C_{10}H_{19}N.HCl$ (189.73): C, 63.30; H, 10.63; N, 7.38; Cl, 18.69. Found: C, 63.59; H, 10.79; N, 7.06; Cl, 18.83.

The hydrochloride is quite soluble in water; it does not melt below 300° C.

The phosphate was obtained in a similar way.

*Analysis.*—Calcd. for $C_{10}H_{19}N.H_3PO_4$ (404.53): C, 47.80; H, 8.83; N, 5.58; P, 12.30. Found: C, 47.84; H, 8.69; N, 6.70; P, 11.94.

The phosphate is a white crystalline salt, soluble in water, but insoluble in ethanol. It melts at 281–283° C. with effervescence.

EXAMPLE 5

Preparation of 2-(N,N-dimethylamino) isocamphane

A mixture of 20 g. (0.105 mole) of the hydrochloride of dl-2-aminoisocamphane, 150 ml. of water, 34 ml. of 40% formalin, 1.0 g. of sodium acetate (anhydr.) and 2.0 g. of the catalyst (5% palladium on charcoal) was hydrogenated at room temperature and a pressure of 40 pounds for about 18 hours. After this time the equivalent of one mole of hydrogen was absorbed and the reaction had slowed down considerably. Then 2 grams of the palladium catalyst was added to the reaction mixture and hydrogenation continued (at R.T° and 40 p. s. i.) for 24 hours longer during which time another mole-equivalent of hydrogen was taken up. After filtration of the catalyst, the clear colorless filtrate was concentrated in vacuo at about 40–50° C. and the residual oil flushed several times with water and ethanol to remove excess formaldehyde. The partially crystalline residue was dissolved in 100 ml. water and the solution rendered alkaline with 45 ml. of 2.5 N NaOH with ice cooling. The amine was then extracted with 1×100 ml. and 3×50 ml. of ether, the combined ether extracts washed with 1×100 ml. water, then dried over anhydrous magnesium sulfate. After removal of solvent the pale yellow, oily residue is fractionally distilled in vacuo. Yield, 16.2 g. of dl-2-(N,N-dimethylamino) isocamphane B. P. 65–66° C. at 2 mm., $n_D^{25}$ 1.4898.

The base was converted to the hydrochloride by dissolving the amine in 160 ml. anhydrous ether and precipitating with ethereal HCl solution using Congo red as an indicator. After filtration and washing with ether, 16.4 g. of the hydrochloride, melting at 166–169° C. with decomposition, was obtained.

*Analysis.*—Calcd. for $C_{12}H_{24}ClN$ (217.8): C, 66.18; H, 11.11; N, 6.43; Cl, 16.28. Found: C, 66.17; H, 10.81; N, 6.54; Cl, 16.1.

Crystallization of the hydrochloride salt from boiling methyl isobutyl ketone (1 g. compound per 17 ml.) gave a crystalline product, melting at 171–172° C. (dec.). A second crystallization raised the melting point to 173–174° C. (dec.).

EXAMPLE 6

Preparation of 2-acetamidoisocamphane

To 30 grams of dl-2-aminoisocamphane (M. P. 174°) was gradually added 120 ml. acetic anhydride with external cooling. After adding about one ml. of conc. sulfuric acid with good agitation a clear solution was obtained, which was allowed to age at room temperature for about 15 hours. The reaction mixture was then added slowly to 600 ml. of water with cooling and vigorous stirring. The white amorphous precipitate which formed gradually became crystalline with stirring. It was filtered by suction, well washed with water and air dried. The dl-2-acetamidoisocamphane melted at 132–134° C.

Crystallization from hot Skellysolve C (B. 95–100°; 18 ml./g.) raised the M. P. to 133–135.5° C.

*Analysis.*—Calcd. for $C_{12}H_{21}NO$ (195.3): C, 73.77; H, 10.83; N, 7.18. Found: C, 73.48; H, 10.58; N, 7.18.

EXAMPLE 7

Preparation of 2-(N-ethylamino) isocamphane

A solution of 4.0 g. of once crystallized dl-2-acetamido isocamphane in 90 ml. of anhydrous ether, was added over a period of 25 minutes with stirring to a solution of 1.75 g. (0.046 mole) of lithium aluminum hydride in 100 ml. of absolute ether. After refluxing for 3 hours, the mixture was slightly cooled and with vigorous stirring 8.3 ml. water was added very cautiously. The white granular precipitate was filtered and washed with ether. The ether extracts were washed with 2×50 ml. water then dried over anhydrous sodium sulfate. After concentrating the ether extract to a small volume, ethereal-HCl was added with cooling to a pH of about 3. The resulting white precipitate was filtered by suction, washed with ether (until free of HCl), then air dried. The dl - 2 - (N - ethylamino) isocamphane hydrochloride melted at 248° C. Crystallization from boiling isopropanol (225 ml.) gave pure dl-2-(N-ethylamino) isocamphane hydrochloride, melting at 260–1° C. wtih decomposition.

*Analysis.*—Calcd. for $C_{12}H_{24}NCl$ (217.78): C, 66.18; H, 11.11; N, 6.43; Cl, 16.28 Found: C, 66.04; H, 11.16; N, 6.16; Cl, 16.12.

When the N-ethyl compound so obtained is treated with acetic anhydride in the presence of a small amount of sulfuric acid as described in Example 6, the acylated derivative is obtained. The acylated ethyl derivative is then reduced with lithium aluminum hydride following the method described in the foregoing example to obtain 2-(N,N-diethylamino) isocamphane.

EXAMPLE 8

Preparation of 2-(N-butyrylamino) isocamphane

Normal butyryl chloride (16 ml.) was added in portions with ice cooling to 8.0 g. of dl-2-aminoisocamphane, followed by the gradual addition of 80 ml. of 20% sodium hydroxide solution. The mixture was vigorously agitated until reaction had ceased and then diluted with 150 ml. water. After extraction of the reaction mixture with 3×80 ml. of benzene, the combined extracts were washed with 2.5 N NaOH (75 ml.), water (2×100 ml.), 2.5 N HCl (75 ml.) and again with 3×100 ml. of water. After drying the extract and removing the solvent, dl-2-(N-butyrylamino) isocamphane, melting point 75–76.5° C. was obtained.

*Analysis.*— Calcd. for $C_{14}H_{25}NO$ (223.35): C, 75.28; H, 11.28; N, 6.27. Found: C, 75.49; H, 11.01; N, 6.33.

EXAMPLE 9

Preparation of 2-(N-n-butylamino) isocamphane

To a solution of 2.62 g. (0.069 mole) of $LiAlH_4$ in 150 ml. absolute ether was added with stirring 7.0 g. (0.031 mole) of dl-2-(N-butyrylamino) isocamphane dissolved in 60 ml. of dry ether. After gently refluxing overnight, the mixture was treated with 13 ml. of water, and the powdery metal hydroxide mixture which formed was filtered and washed with ether. After washing the ether extract with water (3×50 ml.), it was dried (anhydr. $MgSO_4$), and concentrated to a volume of about 30 ml. The hydrochloride salt was then precipitated with an ethereal HCl solution (about 8 ml.; pH 3) and the product filtered and washed with ether until free of acid. Upon crystallizing the product from 400 ml. methylisobutylketone pure dl-2-(N-n-butylamino) isocamphane hydrochloride melting at 212.5–213.5° C. was obtained.

*Analysis.*—Calcd. for $C_{14}H_{27}N \cdot HCl$ (245.83): C, 68.40; H, 11.48; N, 5.70; Cl, 14.43. Found: C, 68.75; H, 11.72; N, 5.96; Cl, 14.1.

EXAMPLE 10

Preparation of 2-(N-3,3-dimethylbutyrylamino) isocamphane

To 6.0 g. of dl-2-aminoisocamphane cooled in ice water was added a total of 12.0 ml. t-butylacetylchloride in 3 ml. portions with swirling over a period of about 10 minutes. To the thick slurry was then gradually added a total of 60 ml. of 20% NaOH with good agitation. After shaking for 2–3 hours, the reaction mixture was diluted with 200 ml. water and extracted with 3×60 ml. benzene. The benzene extracts were washed with 2.5 N NaOH (50 ml.), water (2×80 ml.), 2.5 N HCl (50 ml.) and finally with 4×70 ml. water. After drying over magnesium sulfate and removing the solvent, the crystalline dl-2-(N-3,3-dimethylbutyrylamino) isocamphane melting at 106–8° C. was obtained.

Crystallization from hot Skellysolve C (B. P. 95–100° C.) gave pure product, melting at 107–108.5° C.

*Analysis.*—Calcd. for $C_{16}H_{29}NO$ (251.40): C, 76.44; H, 11.63; N, 5.37. Found: C, 76.13; H, 11.48; N, 5.59.

EXAMPLE 11

Preparation of 2-(N-3,3-dimethylbutylamino) isocamphane

To a mixture of 6.1 g. (0.16 mole) of lithium aluminum hydride in 350 ml. absolute ether was added 6.77 g. (0.027 mole) of dl-2-(N-3,3-dimethylbutyrylamino) isocamphane dissolved in 80 ml. ether. After refluxing for about 19 hours, the reaction mixture was decomposed by the gradual addition of 30 ml. water and the inorganic salts filtered and washed with ether. The ether filtrate was washed with water (3×100 ml.) and dried over magnesium sulfate. After concentrating to a small volume, the hydrochloride salt was precipitated by the addition of a cold saturated ethereal hydrogen chloride solution (ca. 10 ml.) until acid to Congo paper. The precipitated dl-2-(N - 3,3 - dimethylbutylamino) isocamphane was filtered and washed with ether. After crystallizing from hot methylisobutyl ketone the product was found to melt at 233–4° C. with decomposition.

*Analysis.*—Calcd. for $C_{16}H_{31}N \cdot HCl$ (273.89): C, 70.16; H, 11.78; N, 5.12. Found: C, 70.25; H, 11.86; N, 5.31.

EXAMPLE 12

Preparation of trimethyl ammonium iodide of 2-aminoisocamphane

To a solution of 4.68 g. (0.021 mole) of dl-2-(N,N-dimethylamino)-isocamphane hydrochloride in 100 ml. water was added with ice cooling 8.4 ml. of 2.5 N NaOH and the free amine extracted from the mixture with 4×50 ml. benzene. After washing the combined benzene extracts with a small amount of water (25 ml.), and drying over anhydrous magnesium sulfate, solvent was removed in vacuo. The free amine so obtained was dissolved in 10 ml. absolute ethanol and 3 ml. of methyl iodide and 3 ml. of a 1% solution of sodium ethylate in ethanol (freshly prepared) were added. The mixture was refluxed on the steam bath for about 18 hours and the white crystalline precipitate filtered, washed with ethanol (4×1 ml.) and then ether. After air-drying the crude solid was triturated with chloroform (10×10 ml.). Evaporation of the chloroform extract yielded the quaternary salt, the trimethylammonium iodide of dl-2-aminoisocamphane melting at 181–182° C. with decomposition.

This product crystallizes from water in stout needles.

EXAMPLE 13

*Preparation of d-2-(N-methylamino) isocamphane and 1-2-(N-methylamino) isocamphane*

To a cold solution of 25.0 grams of dl-2-(N-methylamino) isocamphane hydrochloride in 200 ml. of water was added 50 ml. of 2.5 N sodium hydroxide. The free base was extracted with 2×100 ml. portions of ether. The ether solution was dried over sodium sulfate to yield 21.0 grams of free amine.

A solution of the amine (21.0 g.) so obtained in 210 ml. of acetone was mixed with a solution of 26.5 grams of d-camphorsulfonic acid in 200 ml. of acetone. The first crop of crystals was filtered after standing at room temperature for two hours. The d-2-(N-methylamino)-isocamphane-d-camphor-sulfonate so obtained melted at 213–214° C. and had a rotation, $$[\alpha]_D^{25} = +31.2 = (C=2\%$$

in absolute ethanol). Recrystallization failed to increase the specific rotation or the melting point of the salt.

The d-(2-N-methylamino) isocamphane hydrochloride was prepared by treating the d-camphor sulfonic acid salt with an equivalent of 2.5 N sodium hydroxide, extracting the free base with ether, and treating the dried ethereal solution with a solution of hydrogen chloride in ether. The d-2-(N-methylamino) isocamphane hydrochloride after two recrystallizations from isopropanol had a rotation $[\alpha]^{25} = +20.6$ (C=1.57 chloroform) and melted at 262–264° C., dec.

The l-2-(N-methylamino) isocamphane-d-camphor sulfonate can be recovered from the mother liquors from which the d form was separated by evaporating these liquors under diminished pressure. Conversion of the salt to the free base and treatment of the free base with a solution of hydrogen chloride in ether afforded the l-2-(N-methylamino) isocamphane hydrochloride which can be purified further by recrystallization from isopropanol to obtain a product having a rotation of about −20°.

The N-alkyl derivatives of 2-aminoisocamphane and their acid salts as well as the quaternary ammonium salts of the tertiary amines, are useful new chemical compounds having valuable pharmacological properties. Thus, 2-(N-methylamino) isocamphane has been found to be a valuable ganglionic blocking agent which inhibits the transmission of nerve impulses through both the sympathetic and parasympathetic ganglia of the autonomic nervous system. This compound was found to be about twice as active on a mg./kg. basis and substantially longer in duration of action than is hexamethionium bromide based on studies in the anesthetized bilaterally vagotomized dog making use of (1) stimulation of the peripheral end of the cut vagus, (2) carotid occlusion and, (3) the response to the injection of nicotine.

The N-alkyl derivatives of 2-aminoisocamphane in amounts ranging from about 10–50 mgs. per day can be administered both orally and by injection for use as a ganglionic blocking agent.

For oral administration the novel compounds of this invention can be administered in suitable forms such as tablets or capsules containing suitable extenders and excipients which can be prepared in accordance with procedures well known in the art. For example, tablets containing about 10 mg. each of 2-(N-methylamino) isocamphane hydrochloride can be prepared as follows:

105 g. 2-(N-methylamino) isocamphane hydrochloride
291.9 g. lactose
115.5 g. dicalcium phosphate
31.5 g. starch
10.5 g. accacia gum
10.5 g. talc
2.1 g. magnesium stearate The isocamphane compound, lactose, dicalcium phosphate, starch and accacia gum were mixed and passed through a No. 60 bolt. After adding the talc and magnesium stearate to the bolted material, the mixture was slugged to form granules. The granules were then passed through a No. 12 and then a number 18 sieve, and the fines reslugged to form granules of the desired size. The granules were then compressed into tablets.

Solutions of the N-alkylated amines suitable for parenteral injection are also prepared in accordance with procedures well known in the art. For example, the following are formulations of suitable solutions:

10% SOLUTION

10% 2-(N-methylamino) isocamphane hydrochloride
0.9% sodium chloride
q. e. s.-pyrogen-free water pH—5.45

1% SOLUTION

1% 2-(N-methylamino)isocamphane hydrochloride
0.57% sodium chloride
0.15% methylparaben
0.02% propylparaben
q. e. s.-pyrogen-free water pH—5.35

In the above-described formulations, the 2-(N-methylamino) isocamphane hydrochloride can be replaced by other acid salts of the isocamphane, or by other alkylated derivatives of 2-aminoisocamphane. Alternatively, quaternary ammonium salts of the tertiary aminoisocamphane compounds, such as methane halide salts, for example, the methyl chloride or methyl bromide, or the methosulfate can be utilized. Examples of such quaternary ammonium salts that might be mentioned are the methiodide of 2-(N,N-dimethylamino) isocamphane, the methochloride of 2-(N,N-diethylamino) isocamphane, and the methosulfate of 2-(N,N-diisopropylamino) isocamphane.

Various changes and modifications of the invention can be made and, to the extent that such variations incorporate the spirit of this invention, they are intended to be included within the scope of the appended claims.

What is claimed is:

1. A compound from the group consisting of compounds of the formula

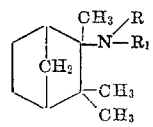

wherein R is lower alkyl and $R_1$ is a substituent from the group consisting of lower alkyl and hydrogen, and pharmacologically acceptable acid salts thereof.

2. A 2-(N-lower alkyl-amino) isocamphane.
3. 2-(N-methylamino)-isocamphane.
4. Pharmacologically acceptable acid salts of 2-(N-methylamino)-isocamphane.
5. The hydrochloride salt of 2-(N-methylamino) isocamphane.
6. 2-(N,N-dimethylamino) isocamphane.
7. 2-(N-3,3-dimethylbutylamino) isocamphane.
8. d-2-(N-methylamino) isocamphane.
9. l-2-(N-methylamino) isocamphane.

(References on following page)

References Cited in the file of this patent

UNITED STATES PATENTS

| | | |
|---|---|---|
| 2,573,673 | Ritter | Oct. 30, 1951 |
| 2,640,846 | Hurwitz | June 2, 1953 |
| 2,692,282 | Brown | Oct. 19, 1954 |

FOREIGN PATENTS

| | | |
|---|---|---|
| 583,565 | Germany | Sept. 21, 1933 |

OTHER REFERENCES

Elsevier Encyclopedia of Org. Chem., Series III, vol. 12A (1948, Elsevier Pub. Co.), pp. 609–11, 613, 615, 616, 649–50.

Elsevier Encyclopedia of Org. Chem., Series II, vol. 12A (1948), pages 608, 606, 605.

Ritter et al.: "J. Am. Chem. Soc.," vol. 70 (1948), pp. 4045 to 4048.

Gaylord: "Reduction with Complex Metal Hydrides" (1956), pp. 551 to 554.